(12) United States Patent
Salomon et al.

(10) Patent No.: US 8,732,060 B2
(45) Date of Patent: May 20, 2014

(54) SYSTEM AND METHOD FOR PROGRESSIVE TRANSITIONS PORTFOLIO INVESTMENT MANAGEMENT

(75) Inventors: Dalal Maria Salomon, Richmond, VA (US); Philip Justin vanBlaricom, Richmond, VA (US); Daniel Buford Ludwin, Richmond, VA (US)

(73) Assignee: D2V Technologies, LLC, Richmond, VA (US)

( * ) Notice: Subject to any disclaimer, the term of this patent is extended or adjusted under 35 U.S.C. 154(b) by 0 days.

(21) Appl. No.: 13/022,162

(22) Filed: Feb. 7, 2011

(65) Prior Publication Data

US 2011/0196809 A1    Aug. 11, 2011

Related U.S. Application Data

(60) Provisional application No. 61/302,079, filed on Feb. 5, 2010.

(51) Int. Cl.
*G06Q 40/00*    (2012.01)

(52) U.S. Cl.
USPC ......................................................... 705/36 R

(58) Field of Classification Search
USPC .......................................... 705/36 R, 37, 35
See application file for complete search history.

(56) References Cited

U.S. PATENT DOCUMENTS

| | | | | |
|---|---|---|---|---|
| 6,801,201 B2* | 10/2004 | Escher | ......................... | 705/36 R |
| 7,120,598 B2* | 10/2006 | Ocampo | ......................... | 705/35 |
| 7,174,313 B1* | 2/2007 | Martinez | ..................... | 705/36 R |
| 7,739,172 B2* | 6/2010 | Voudrie | ....................... | 705/36 R |
| 7,848,992 B2* | 12/2010 | Turner | ............................. | 705/37 |
| 2004/0098327 A1* | 5/2004 | Seaman | .......................... | 705/36 |
| 2005/0154662 A1* | 7/2005 | Langenwalter | ................ | 705/35 |
| 2007/0239571 A1* | 10/2007 | Michaletz | ....................... | 705/35 |
| 2008/0288329 A1* | 11/2008 | Nannis et al. | .................. | 705/10 |
| 2012/0185408 A1 | 7/2012 | Scott | | |
| 2012/0246094 A1 | 9/2012 | Hsu | | |
| 2012/0278258 A1 | 11/2012 | Ayal | | |

FOREIGN PATENT DOCUMENTS

| | | | | |
|---|---|---|---|---|
| CA | 2616364 | * | 12/2007 | ............. G06Q 40/00 |
| WO | WO 03/065254 | * | 8/2003 | ............. G06F 17/60 |

OTHER PUBLICATIONS

Masters, Seth J.: Rebalancing : A important tool for controlling portfolio risk, Alliance Bernstein Investment Research and Management, New York, 2005, pp. 1-6.*

(Continued)

*Primary Examiner* — Bijendra K Shrestha
(74) *Attorney, Agent, or Firm* — Brummett TechLaw PLLC

(57) ABSTRACT

The present invention discloses a system and a method providing for a progressive transition of the holdings within a portfolio that takes periodic gains as the market rises and utilizes a portion of those gains to buy back in as the market falls while providing for a gradual reduction in the volatility of the portfolio. Many existing systems only allow one stop-loss or trailing stop-loss value to be used resulting in the complete liquidation of the investment once the target value is breached while some newer systems involve the use of two or more different protection levels per security, some of which may adjusted to reflect market performance and some of which may be essentially fixed. As will be appreciated by those in the art, the various systems may be adjusted to reflect the financial goals and risk tolerance of particular clients.

14 Claims, 7 Drawing Sheets

(56) References Cited

OTHER PUBLICATIONS

Llovio, L: Big Buzz: Two financial advisors got push from tough times, Mar. 29, 2010, Richmond Times Dispatch, pp. 1-4.*

Murphy, J: Trading Strategies, Jun. 14, 2000, Internet Archives, pp. 1-38.*

Salomon & Ludwin web page: The TriggerPoint Strategy, 2012, www.salomonludwin.com, pp. 1-2.*

* cited by examiner

TriggerPoint Trigger Tracker
2/2/2011

| | Large Cap Growth | Large Cap Value | Mid Cap Growth | Mid Cap Value | Small Cap Growth | Small Cap Value | International | Emerging |
|---|---|---|---|---|---|---|---|---|
| % from Sell Trigger | 5.36% | 0.91% | 1.70% | 6.12% | 3.46% | 5.72% | 3.69% | 6.86% |
| % from Buy Trigger | -15.01% | -15.43% | -14.83% | -15.29% | -14.55% | -14.71% | -16.53% | -12.22% |
| Previous Trigger | Sell Trigger | Sell Trigger | Sell Trigger | Sell Trigger | Sell Trigger | Sell Trigger | Sell Trigger | Sell Trigger |
| Date of Last Trigger | 12/20/10 | 12/10/10 | 11/30/10 | 01/14/11 | 12/02/10 | 12/17/10 | 11/03/10 | 10/12/10 |
| Consecutive Rise/Decline | 30.0% | 22.5% | 30.0% | 30.0% | 30.0% | 30.0% | 30.0% | 30.0% |
| % gain sold / % cash bought | 50.0% | 40.0% | 50.0% | 50.0% | 50.0% | 30.0% | 30.0% | 50.0% |
| Current Cumulative Rate of Return | 2.04% | 6.56% | 6.83% | 1.32% | 3.91% | 1.71% | 3.77% | 0.62% |
| Maximum Daily Value | 2.07% | 6.56% | 6.83% | 1.32% | 4.53% | 2.79% | 3.77% | 4.33% |

| | | | | | | | | |
|---|---|---|---|---|---|---|---|---|
| % of gain to sell on next Sell | 60.00% | 50.00% | 60.00% | 60.00% | 60.00% | 40.00% | 40.00% | 60.00% |
| % of cash to be used on next Buy | 20.00% | 20.00% | 20.00% | 20.00% | 20.00% | 20.00% | 20.00% | 20.00% |
| % of Total Opportunity Cash | 23.63% | 17.60% | 14.83% | 13.44% | 8.45% | 4.86% | 8.00% | 9.19% |

FIG. 7

SYSTEM AND METHOD FOR PROGRESSIVE TRANSITIONS PORTFOLIO INVESTMENT MANAGEMENT

PRIORITY STATEMENT

This application claims priority, pursuant to the provisions of 35 U.S.C. §119(e), from U.S. Provisional Application No. 61/302,079, which was filed on Feb. 5, 2010, the contents of which are incorporated by reference, in their entirety and for all purposes.

TECHNICAL FIELD OF THE INVENTION

The system and method disclosed herein relate generally to dynamic portfolio management incorporating a number of triggers for buying or selling investments in an incremental manner based on analysis of market condition trends. The system and method disclosed herein relate more specifically to improved portfolio management incorporating multiple trigger points for both rising and falling markets.

BACKGROUND OF THE INVENTION

As noted above, numerous software packages are advertised as providing some "Portfolio Management" functionality, but many of these systems focus on the accounting functions necessary to track transactions within an account, keeping the accounts in balance and generating reports reflecting gains and losses of the portfolio. Some systems include additional features such as contact management, financial planning functions and/or basic security analysis. Some systems may also allow model portfolios to be generated and compared against other models and/or the actual performance of the current portfolio.

Although some existing systems, particularly those that provide some financial planning functions, may also be able to generate portfolio return estimates. These systems, however, tend to rely on historical returns for each of the underlying investment classes without adjustment(s) incorporating short-term, forward-looking estimates of market performance that reflect new information. According, the results based on historical returns can diverge significantly from those returns that can reasonably be expected in the short-term and can, therefore, significantly understate or overstate the estimated return. As will be appreciated, neither result provides the necessary guidance to the investor or advisor.

Numerous systems exist in the prior art for determining when to sell a real investment, most of which are applied to short term investing and/or day trading. The most basic incarnation of these system are stop loss orders that are placed with a broker at the time an investment is bought. Although these systems have varying features, buyers typically place a fixed share price threshold that will trigger the sale of a particular investment to be sold. This share price threshold is usually, if not always, a single share price rather than a plurality of share prices coordinated with corresponding liquidation percentages. Some of these stop loss systems are automated through one or more computer programs that track the price of the target investment and initiate the selling trade when a dynamic share price threshold is broken by the downward movement in an investment's price. These systems are commonly referred to as trailing stop loss systems.

As will be appreciated, these fixed and trailing stop loss systems are generally inadequate for enabling long-term investors to reach their financial goals. For example, if a fixed stop loss was placed at $95 for an investment purchased at $100 per share, regardless of the increase in the share price the only automatically generated sale will result in a loss. A trailing stop loss system would improve upon this performance by, for example, utilizing a stop loss of $5 per share would tend to preserve some of the gains. As the investment increases in value, however, the trailing stop loss increment will represent a decreasing percentage of the investment share value and will tend to increase trades initiated by only minor perturbations of the investment value. Another type of stop loss system is found in U.S. Pat. No. 7,739,172 to Voudrie which incorporates a number of sell triggers and a number of liquidation percentages and allows for dynamic adjustment of the sell triggers based on current data including, for example, time sliced data on an investment's price retrieved a communication medium such as the Internet and used for automatically adjusting the triggers on a "real-time" basis.

SUMMARY OF THE INVENTION

The present invention is directed to a method and system for managing financial investments using pre-determined and automated algorithm-based buy-sell "triggers," thereby locking in investment gains while reducing probability of catastrophic investment losses. The specific buy-sell "triggers" are pre-determined sector-based market prices of investment securities (stocks, bonds, etc.), established by algorithms functionalized into computer software. The system includes information and decision support components delivered by software, computer and/or other means. The inventive system provides a disciplined approach to the buy/sell decisions inherent in managing a portfolio by automatically (i) selling securities and "taking" investment gains during a market upswing, when others might yield to "greed" and/or "see how far the gains go" reasoning and (ii) purchasing securities during a market downturn, when others might otherwise be acting on fear and removing money from the market, thereby missing out on the opportunity for future gains.

As disclosed in more detail below, the system and method of portfolio management may comprise several distinct modules that can, in turn, be organized in a variety of configurations to adapt the system and method to the goals of one or more investors. The overall system and method use readily available financial information and rate of return calculations to detect whether a buy or sell trigger point has been reached by the particular investment(s). When a trigger point has been reached, the system and method are configured for executing an appropriate response in light of the historical performance of the investment(s). During a rising market, the system and method will periodically generate sell orders in order to capture a portion of the available gains that are, in turn, allocated to ready cash reserves and fixed income investments (bonds), gradually shifting the portfolio to a more conservative position. During a falling market, the system and method will periodically generate buy orders in order to increase the equity holdings and position the portfolio to take advantage of any subsequent recovery of the investment value. The TriggerPoint™ system disclosed infra uses a portion of the cash that had been set aside from previous "sell triggers" in order to implement the buys.

BRIEF DESCRIPTION OF THE DRAWINGS

FIG. 7 is a chart illustrating the various trigger point offsets for an exemplary eight sleeve portfolio.

DETAILED DESCRIPTION

Figure 1:
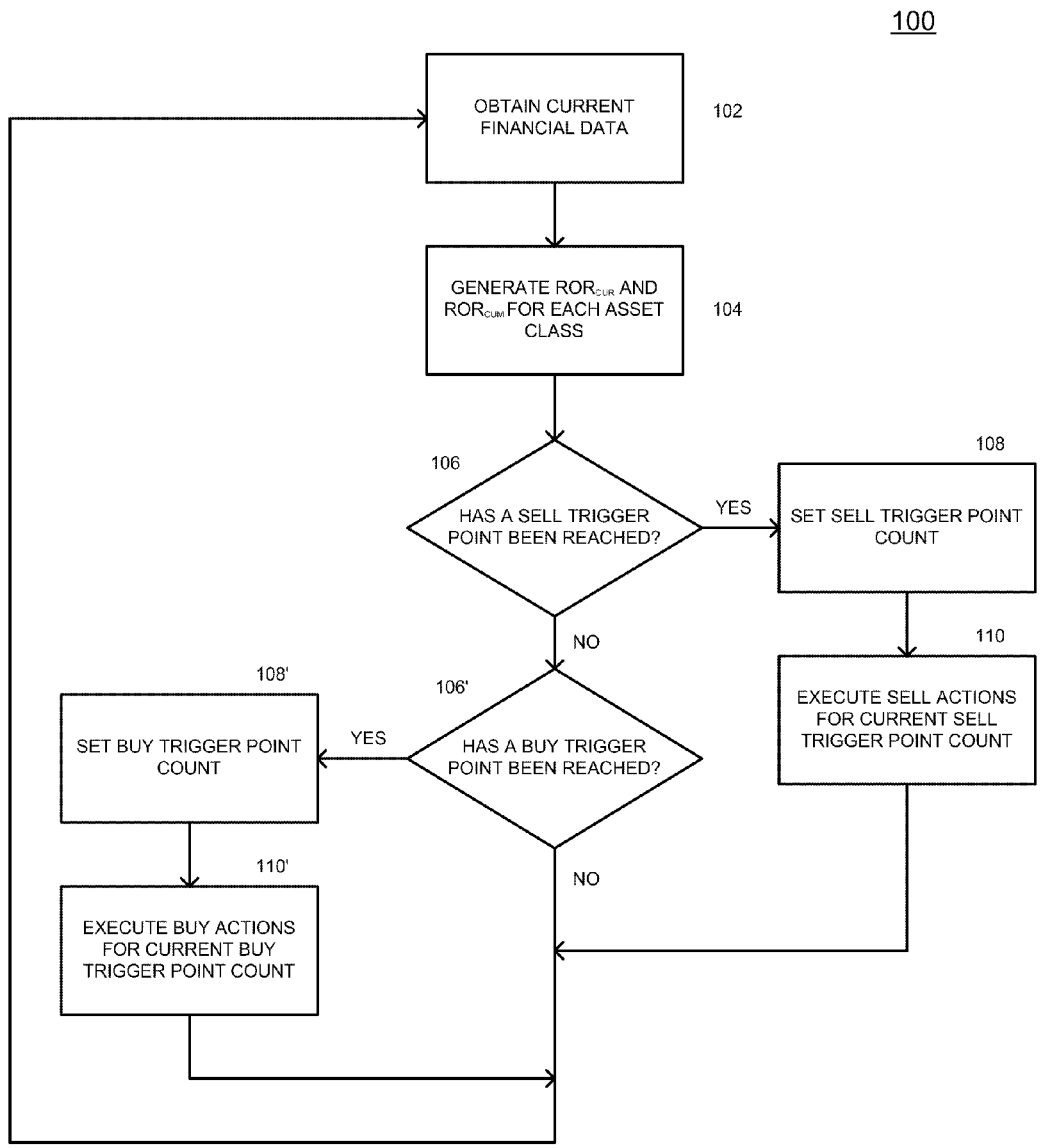
FIG. 1 is a schematic diagram that illustrates the trigger point portfolio management system.

In the following detailed description of the invention and exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and various other changes may be made without departing from the scope of the invention as defined in the claims below. The following detailed description should not, therefore, be read as unduly limiting the invention or the scope of the appended claims.

In the following description, numerous specific details are set forth to provide a thorough understanding of the invention. It should be understood, however, that the invention may be practiced without these specific details. In other instances, well-known portfolio management techniques and methods known to one of ordinary skill in the art have not been shown or discussed in detail in order not to obscure the invention.

The method utilizes pricing data, typically from the previous day's closing values, for the exchange traded funds (ETFs) or other investment vehicles tracked in the portfolio that may be automatically, semi-automatically or manually input to or otherwise made available to the system on which the method is operating. The pricing data may be verified before being made available for use in the method. The pricing data is then analyzed to determine if a buy/sell trigger has been reached. An example series of calculations may run as follows:

First, the previous day's closing prices are used to calculate the difference between the last imported price and the previous day's close to determine a "Current Rate of Return" ($ROR_{CUR}$);

The $ROR_{CUR}$ is then used to calculate a "Cumulative Rate of Return" ($ROR_{CUM}$) that is, in turn, used for determining if a buy or sell trigger has been reached for the particular ETFs;

If a buy or sell trigger has been reached, a buy/sell look up table or other transaction guidance information is accessed to determine what percentage of the ETFs to sell and how to distribute the resulting funds or what percentage of the available opportunity should be used to buy back into the market.

The transactional guidance information (TGI) may be a simple table providing a series of buy/sell trigger points with each trigger point resulting in a predetermined action or series of actions with respect to the ETFs and associated funds. The TGI may also include an assumption table (AT) that includes, for example, series of conditional elements that take into account the historical performance of the ETFs whereby the action generated by a first sell trigger point may be substantially different than the action generated by the $n^{th}$ consecutive sell trigger point. Similarly, a first buy trigger point achieved after one or more sell trigger points may generate an action substantially different than the action generated by the $m^{th}$ consecutive buy trigger point. As will be appreciate by those skilled in the art, the TGI may provide a varying series of action for addressing a wide range of buy/sell trigger point patterns.

In order to execute the method as directed by more complex TGI, the method can track the number of consecutive triggers of either type. For example, an increase in the asset class to a level sufficient to reach the first sell trigger point would result in the sale of a predetermined portion of the incremental gain associated with the first trigger point $TP_{S1}$, and, preferably, a predetermined distribution of the resulting funds between opportunity cash and bonds according to other corresponding portions of the TGI. If the associated asset class continued to grow and hit the next sequential sell trigger point, the method would trigger the sale of another predetermined portion of the incremental gain associated with the second sell trigger point $TP_{S2}$ (which may be different from that associated with $TP_{S1}$), and again, would preferably distribute the resulting funds between opportunity cash and bonds according to other portions of the transactional guidance information. Continued increases in the price of the associated asset class would continue the series of sell trigger points culminating with the sale of 100% of any incremental gains within the particular asset class.

If, however, the value of the associated asset class where to fall, after the actions associated with $TP_{S1}$ had been executed, to a level sufficient to reach the first buy trigger point, $TP_{B1}$, a portion of the opportunity cash would be utilized to buy back into the associated asset class. If the asset class were to then resume its rise and next reach a sell trigger point, the sell trigger point count could be reset to the conditions associated with $TP_{S1}$. Indeed, it is expected that in the event of alternating buy and sell trigger points, or even in instances where two or three consecutive buy or sell trigger points have been reached, an intervening counter trigger point will reset the trigger point counter to 1. If, however, a longer series of trigger points of a single type have been reached, it is preferred that a single counter trigger point not result in a total reset so that the trigger point progression would be re-entered at some intermediate level.

The inventive system entails multiple steps and components. After evaluating an investment client's needs in terms of strategic asset allocation between equities and bonds, the system divides the equity portion of the client's allocation into a number of security groupings which may also be referred to as investment sectors, asset classes, equity sleeves, investment sleeves and/or, more simply, sleeves (the number and composition of which may be adapted for each client and/or modified over a period of time for a single client or account).

For purposes of illustration only, an 8-sleeve embodiment of the system may use a combination of the following sleeves:
  i. Large Cap Growth Index;
  ii. Large Cap Value Index;
  iii. Mid Cap Growth Index;
  iv. Mid Cap Value Index;
  v. Small Cap Growth Index;
  vi. Small Cap Value Index;
  vii. International Index; and
  viii. Emerging Markets Index.

Each of the sleeves will, in turn, have an associated cash sub-sleeve that is used for tracking the cash generated by the sales at each of the sell trigger points reached by the combination of securities within that particular sleeve. As will be appreciated, a particular portfolio may have different combinations and numbers of sleeves depending on a particular investor's goals and risk tolerance. Predetermined sell and buy triggers can then be established for each equity sleeve, as further described as follows.

Buy/Sell Triggers

Certain of the attributes associated with, and the logic for determining, the various trigger points are explained in more detail below. The inventive method is designed so that with a stroke of a computer key-equity performance information is periodically, randomly or substantially continuously uploaded into the system and analyzed to determine and alert the user if a buy or sell has been triggered in any of the investment sleeves.

i. Triggers are preferably established by back testing the model on each asset class to determine the probability of markets moving up or down and the frequency of those movements to determine the trigger points and increments for each buy and sell.

ii. Progressive nature of triggers:

1. As each individual market goes up, the program alerts the user to a trigger and the amount to sell. The amount sold is increased by a multiplier with each consecutive sell trigger point. History has shown that the greater the increase observed in a particular market, the greater the chance of a subsequent decline or "adjustment," so that continued increases warrant additional sales from the market both to secure incremental gains and to prepare for a decline.

2. As each individual market goes down the program alerts the user to a buy trigger and the amount to buy. The amount bought is increased by a multiplier with each consecutive buy trigger with the buy amount being a percentage of the opportunity cash allocated to that particular sleeve.

The Banking Strategy

As sell triggers occur, the program is designed to employ a strategy for the proceeds of each sale. The program is designed so that at least a portion of each sale goes into the opportunity cash sleeve of the investment index from which the assets were sold and another portion of the sale can be directed to other assets including, for example, tax free and/or taxable bonds (depending on whether or not the account is Qualified or Non-Qualified for tax purposes). This strategy offers the following benefits to investors:

i. As sell triggers occur, profits are taken from that equity sleeve where the sell occurred and a portion of those profits can be used to gradually increase the bond exposure in the overall portfolio.

ii. As the proportion of bonds within the overall portfolio will tend to increase over time, as portions of the proceeds from the equity market sales are diverted into bonds, the portfolio becomes inherently more conservative.

iii. With the increasing bond exposure, the portfolio is gradually repositioned through operation of the method to provide an increasing amount of income or cash flow as the investor matures, needs spendable income and/or desires cost of living adjustments to keep up with inflation.

The Opportunity Cash Strategy

The adage: "Buy Low and Sell High" has been around for decades. However, the inventors have been unable to find a program that actually takes that strategy and implements it in a comprehensive and automated program. As sell triggers occur, the program is designed to employ a strategy for the proceeds of sale. The program is designed so that a portion of each sale goes into the cash sleeve of the investment index from which the securities were sold. The trading sheet that is generated indicates the amount to go to cash. The strategy for this cash is called The "Opportunistic Cash Strategy."

The opportunistic cash is set aside in an interest bearing money market fund until there is a buy trigger in that investment sleeve. Once a buy is triggered, the program will generate a trading sheet showing exactly how much in that investment sleeve should be bought. Similar to the sell trigger, the buy triggers are progressive in nature. Using a variety of testing scenarios, it was determined that limiting the number of buy triggers to seven consecutive triggers (the seventh buy trigger utilizing 100% of the opportunity case remaining in that particular sleeve) provided a satisfactory balance of performance and conservation over methods utilizing larger or smaller numbers of buy count trigger points.

The Benefits of Opportunistic Cash

The buy and sell trigger points work hand-in-hand. If there were no predetermined sell triggers (sales profits generated as the investments rise), there would be no cash on hand for executing the subsequent buy triggers (buying lower as the investments decline). Human nature is such that investors' emotions tell them to buy more of whatever is increasing and to sell when investments decline. The strategy incorporated in the inventive system avoids the emotional and illogical tendencies of human nature that are based on fear and greed. By generating and having on hand opportunistic cash to buy lower as investments decline, more shares are purchased because the share price has declined, thereby increasing the probability of a profit during a subsequent recovery.

Contributions and Withdrawals

Because the client's allocation will change over time, it is important that the bond/equity mix be taken into consideration when making contributions or withdrawals. For example, to maintain a preferred bond/equity mix, the inventive system can be configured for tracking the asset mix between bonds and equities for each account so that contributions and withdrawals are distributed pro rata from their current asset mix, thereby maintaining the same asset mix despite contributions and/or withdrawals. Conversely, for certain accounts there may be a desire to alter the bond/equity mix periodically or gradually to provide a more or less conservative portfolio. In such instances, the contributions and withdrawals will be reallocated over some period of time so as to shift the initial bond/equity mix to the desired mix.

As will be appreciated, the inventive system uses the cash portion of the portfolio to fund the security purchases when a buy trigger is reached and, therefore, may or may not be used to fund withdrawals. Accordingly, it is anticipated that most withdrawals will generate associated sales regardless of the amount of cash available because of the purpose of the cash in the portfolio is to enable subsequent investment as the market declines.

The Software Component of the System

The functionality of the system may be provided through appropriate computer software configured for tracking the performance of the individual investment sleeves and associated trading. The system can be configured for accessing one or more reporting services or other data sources to obtain the financial information necessary to determine if the cumulative return of any of the sleeves has reached a trigger in either direction and, if a trigger has been reached, the number of the trigger hit, and where the cash is going to or coming from, to generate a trading ticket(s) corresponding to the trigger as well as tracking forms for each day's or other period's update. The output is the determination as to exactly what to sell or buy and where to put the proceeds (whether bonds or money market). The program may be updated periodically, for example daily, and can provide periodic model portfolios.

When a new client buys into the investments managed by the inventive system, they are buying the equity portion of the current model portfolio which generally reflects the performance of the underlying markets and market segments rather than the performance of an individual account. The existing portfolio will, as the result of previous market movements, typically include equity, cash and bond positions in one or more of the sleeves. If, however, a new portfolio was being created, the account holder or manager would have the option of entering with, for example, 1) a complete equity position, i.e., no opportunity cash before the first sell trigger point has been reached and executed, 2) a position utilizing a combination of equity and cash so that "opportunity" cash is available from day one of the portfolio whereby buy trigger points reached before a first sell trigger point can still be executed, 3) a position utilizing a combination of equity, cash and bond positions that may reflect the performance of other active funds or a configuration based on a particular set of investment goals, 4) a position reflecting portofolio performance based on a arbitrary "start" date from which back testing is conducted to produce a current allocation of equity, cash and bond positions or 5) some hybrid combination of these or other approaches adapted to the particular needs of the investor or fund manager.

Example embodiments of the inventive system will also alert the user if an asset rebalancing is necessary based on parameters established for limiting exposure to one or more asset class. The system can be configured to provide awareness on a periodic basis if any of the investments have appreciated or depreciated by a pre-determined percentage amount which "triggers" the need to buy lower or sell higher. As will be appreciated, the triggering process can easily be adjusted by modifying a few parameters, thereby allowing the system to be refined to reflect experienced gained and/or to provide customization for one or more accounts.

The Maximum Daily Value (MDV) is defined as the highest point that a particular asset class has reached. The maximum daily value is used on the first buy trigger point $TP_{B1}$ to determine if the asset class has experienced a true decline of $B_1\%$. For example, let's assume 2 sell trigger points, $TP_{Sm}$ and $TP_{Sm+1}$, have been reached and the asset class continues to appreciate by an additional 7% (but, does not reach the next sell trigger at $S_{m+2}\%$, for example, 7.5%) before beginning a decline. Without the MDV calculation, the next buy trigger point would not occur until that asset class had experienced a $(B_1+7)\%$ decline. By utilizing the MDV calculation, however, the asset class needs only to decline 15% from the highest point (MDV) before the next buy trigger point is reached. This allows the system to capture a true decline in investment value of 15%. This logic is only used on the first buy trigger; each subsequent buy trigger goes off of movements as defined in the assumptions table.

The "Magnitude" reset (as mentioned in the trigger count section) is designed to suppress overreaction to "false starts" and/or relatively minor market movements. The magnitude reset procedure determines the "reentry" trigger number based on a series of rules (assumptions) regarding the sequencing of buy/sell trigger points for controlling entry into the assumptions table and thereby initiating a more appropriate action for the particular performance of the asset class.

An example of the logic that may be applied for controlling entry into a multi-step sell trigger sequence is provided below:

When the trigger point reached="BUY"
    if there are 2 consecutive buy triggers and IF the sell count immediately prior to these buy triggers was at a sell count of at least 13 (on a 14 count scale) then the next sell trigger will be count number 5;
    if there is 1 buy trigger and IF the sell count immediately prior to that buy trigger was at a sell count of at least 13 then the next sell trigger will be count number 7;
    if there are 2 buy triggers and IF the sell count immediately prior to these buy triggers was at a sell count of 2-12 then the next sell trigger will be count number 3;
    if there is 1 buy trigger and IF the sell count immediately prior to that buy trigger was at a sell count of 4-12 then the next sell trigger will be count number 5;
    if there is 1 buy trigger and IF the sell count immediate prior to that buy trigger was at a sell count of 1-3 then the next sell trigger will reset to count number 1.

If the trigger point reached="Sell"
    If immediately prior to the sell trigger the buy count was less than 3 then the next buy trigger number will be reset to count 1;
    If immediately prior to the sell trigger the buy count was at least 3 then the next buy trigger number will be the previous buy count incremented by 1;
    If this trigger is the second consecutive sell trigger, then the next buy trigger will be reset to count 1.

The logic described above addresses the dilemma of a market that has done extremely well and then has a slight correction. The logic rules relating to the particular sequence and relative step of a series of buy/sell trigger points allows the method to respond differently to different "correction" scenarios including, for example, how much of a correction warrants resetting the buy/sell logic back to the respective first buy/sell trigger points.

As will be appreciated, the $ROR_{CUM}$ will very seldom fall exactly on the trigger point as defined in the Assumptions Table and/or other TGI. Because the amount over or under a given trigger point could be significant, the method also incorporates an Overage/Underage Adjustment. The starting point for the $ROR_{CUM}$ calculation for the next trigger is adjusted by a predetermined Overage/Underage Amount in order to more accurately portray the movement of an asset class. For example: if the $ROR_{CUM}$ of the asset class were to rise an additional 1% above the trigger, the amount over the trigger becomes the new starting point for the $ROR_{CUM}$ in calculating the next trigger. In simple terms, under this example, after the trigger is reached you are 1% closer to your next sell trigger.

As detailed above, a feature associated with Buy Trigger Points as executed by the method is that only the opportunity cash available in that asset class is used when calculating buy amounts. Recall that when a sell trigger point is reached, the method calculates how much, for example, what target percent of the current equities, to sell. The proceeds from the sale are used to invest in both fixed income assets, such as bonds, and to fund an opportunity cash reserve for future purchases within that asset class. The method allows for the cash associated with each of the asset classes to be tracked separately.

For example, if a sell trigger point is reached in the Large Cap Growth asset class, a portion of those sale proceeds are moved into opportunity cash but are still associated with the Large Cap Growth sleeve. If, subsequent to the sell trigger points that generated the opportunity cash, a buy trigger point is reached in the Large Cap Growth sleeve, it is preferred that only the opportunity cash associated with that asset class can be used for buys into that asset class. As will be appreciated, the method may be modified to provide for the combination of opportunity cash from more than one asset class to be used during, for example, adjustment of the type, number or relative allocation of the various sleeves within an account.

Once the system has determined that a trigger point has been reached, the Model Values table can be updated to reflect the effect of the actions taken in response to the trigger point. The Model Values table may, for example, reflect the effect of a sell trigger in the value of the positions, the value of the opportunity cash for that sleeve, and the value of the fixed income for that sleeve while the effect of a buy trigger may be reflected in the value of the position, and the value of the opportunity cash for that sleeve only. The belief that most investors should become more conservative over time is reflected in the trigger point system and method that causes a portion of every sale from equities is added to fixed income. The value of the position is increased or decreased by the $ROR_{CUR}$ as determined in the Dashboard Calculations table. If a trigger occurs, the value of the position increases or decreases by the $ROR_{CUR}$. Then, the calculations for how much was bought or sold are executed to determine the resulting value of the position, the opportunity cash, and the fixed income.

The value of equity exposure in the specific asset class sleeve and the opportunity cash in that sleeve are added to determine the portfolio weighting to that asset class. In other words, the opportunity cash is included in the value for that asset class sleeve. This combined value can be used to determine if this portion of the portfolio falls within a rebalance sensitivity limit. The system can provide one or more rebalance sensitivity parameters in an Assumptions table whereby when an asset class plus the opportunity cash in that asset class sleeve exceeds the associated sensitivity percentage, a rebalance opportunity is triggered. For example, if 30% is the assigned sensitivity parameter pulled from the Assumptions Table, when the allocation is determined to be 30% less or 30% more than the originally allocated percentage for that asset class, a rebalancing operation would be initiated. During a rebalancing operation, the system will make adjustments only to the equity portion of the asset class while maintaining the opportunity cash amount.

After all calculations are performed and all actions completed, the system can display a users "Dashboard" or other GUI that has been updated to reflect all triggers and rebalance events. The system can also be configured to generate one or more Trade Tickets that provide a "hard copy" of the associated trading instructions (i.e., how much to buy or sell; the allocation for a new account; trades required if a rebalance has occurred). The Trade Tickets may then be used for requesting or executing the indicated trade transactions. The Trade Tickets may also be provided in one or more electronic formats that may be transferred to a users trading software for placing the indicated transactions.

As will be appreciated, the system may be configured for providing a wide range of reporting functions that may include, for example: graphical displays reflecting performance of the original investment based on back testing; comparison of the model portfolio with various financial benchmarks; graphs reflecting the distributions within each asset class (sleeve), groupings of associated asset classes and/or total portfolio and/or a Trigger Tracker report (as illustrated in FIG. 7), providing a graphical reflection of the values and status of the various asset classes. These reports may incorporate various parameters for reflecting trends over specified time periods; various trigger point information and action(s) to be taken upon obtaining subsequent buy/sell trigger points.

Although the system allows for substantial customization, it is anticipated that most, if not all, investors will be buying into the same equity and cash positions as every other account. The logic behind this approach is that, even though the new investor may not have owned the investments within the portfolio, the market movement still happened and they will be buying based on what has happened in each of the markets and not their individual experience.

An exemplary process flow 100 is illustrated in FIG. 1 in which the current financial data is received 102 from one or more sources and then used to generate the $ROR_{CUR}$ and $ROR_{CUM}$ (or equivalent parameters) for each of the asset classes or sleeves 104. Once these values have been generated, they are used to determine if a buy/sell trigger point has been reached 106, 106'. Although illustrated as a sequential operation, it will be appreciated that the determination regarding the trigger points can be performed in any order or simultaneously depending on system capability and configuration. If a sell trigger point has been reached, the system determines the appropriate sell trigger point count 108 and initiates and/or indicates a need for the sell actions corresponding to that particular sell count 110. If it is determined that no trigger point has been reached, or after the appropriate buy/sell trigger point actions have been initiated, the process recycles and obtains the next set of current financial data 102. As will be appreciated, the system can be readily configured to obtain updated financial data for one or more asset classes on weekly, daily, hourly and/or substantially continuous basis depending on the particular types of financial vehicles being monitored and/or the anticipated or historical volatility of a particular asset class.

Figure 2:
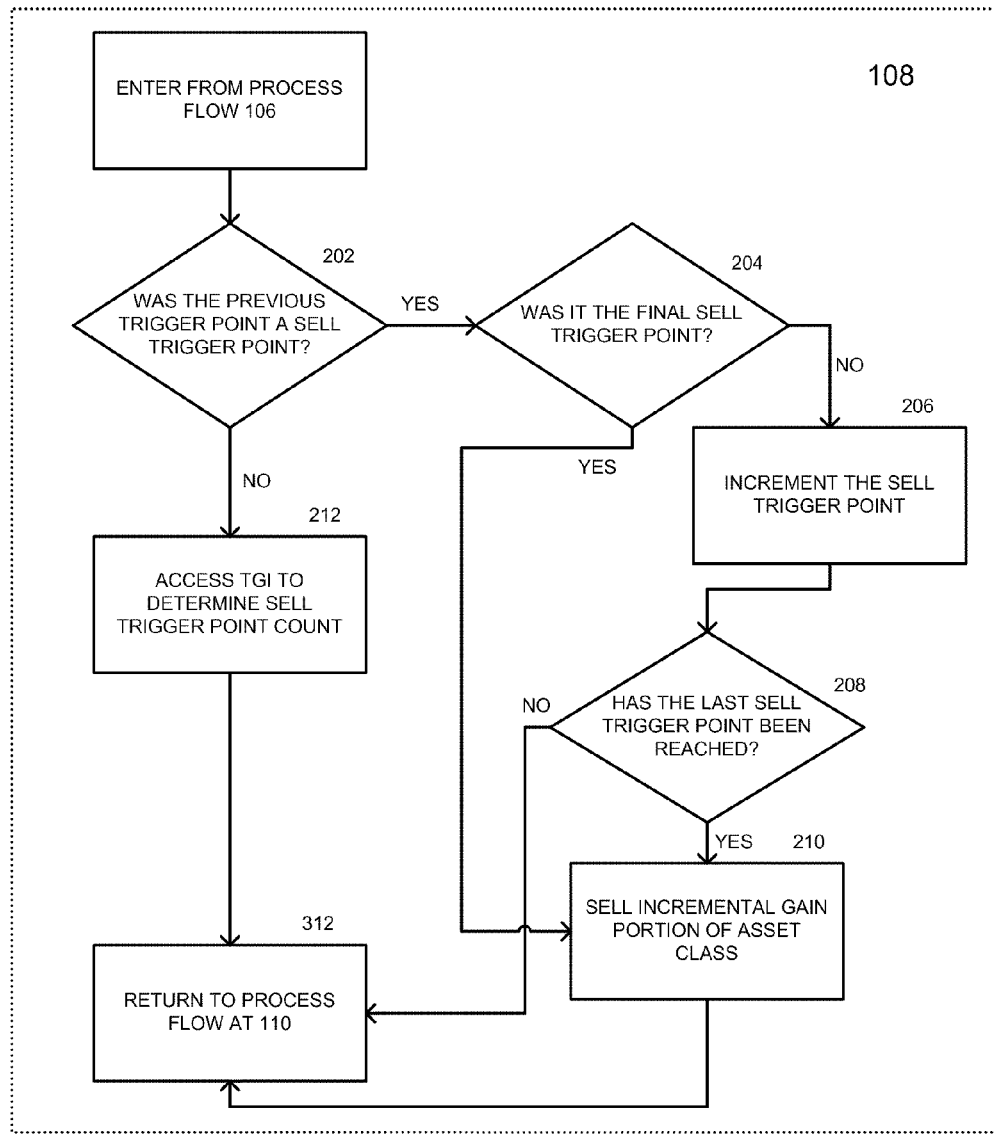
FIG. 2 is a schematic diagram providing additional detail regarding certain of the operations illustrated in FIG. 1.

As illustrated in FIG. 2, the process of determining the appropriate sell trigger point count may involve additional steps 200 that will take into account the particular sequence of trigger points preceding 202 the currently detected. If the previous trigger point was also a sell trigger point 202 and was not the last sell trigger point 204, then the sell trigger point count is simply incremented 206 and the action designated for the current trigger point is initiated. If the previous trigger point was not a sell trigger point 202, then the transactional guidance information (TGI) is accessed and the conditional rules provided therein are applied to the particular sequence of trigger points to determine the appropriate sell trigger point count 212. When the last, or highest, sell trigger point count has been reached 208, the incremental gains are taken until such time as the sell trigger point is completely or partially reset as the result of an intervening buy trigger point.

Figure 3:
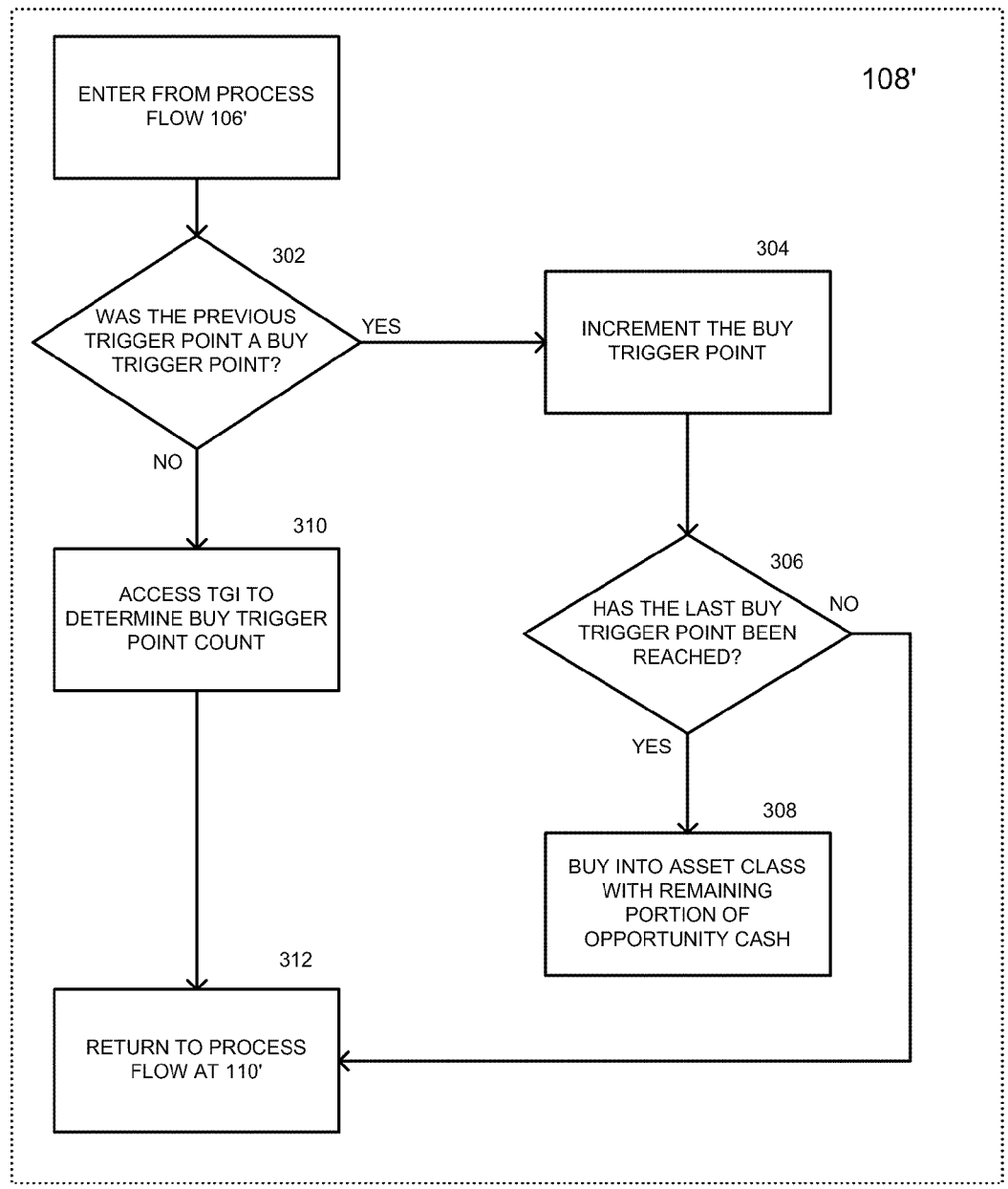
FIG. 3 is a schematic diagram providing additional detail regarding certain of the operations illustrated in FIG. 1.

As illustrated in FIG. 3, the process of determining the appropriate buy trigger point count may involve additional steps 300 that will take into account the particular sequence of trigger points preceding the currently detected. If the previous trigger point was also a buy trigger point 302, then the buy trigger point count is simply incremented 304 and the action designated for the current trigger point is initiated. If the previous trigger point was not a buy trigger point 302, then the transactional guidance information (TGI) is accessed and the conditional rules provided therein are applied to the particular sequence of trigger points to determine the appropriate buy trigger point count 310. When the last, or highest, buy trigger point count has been reached 306, the remaining opportunity cash is used to buy back into the position until such time as the buy trigger point is completely or partially reset as the result of an intervening sell trigger point.

Figure 4:
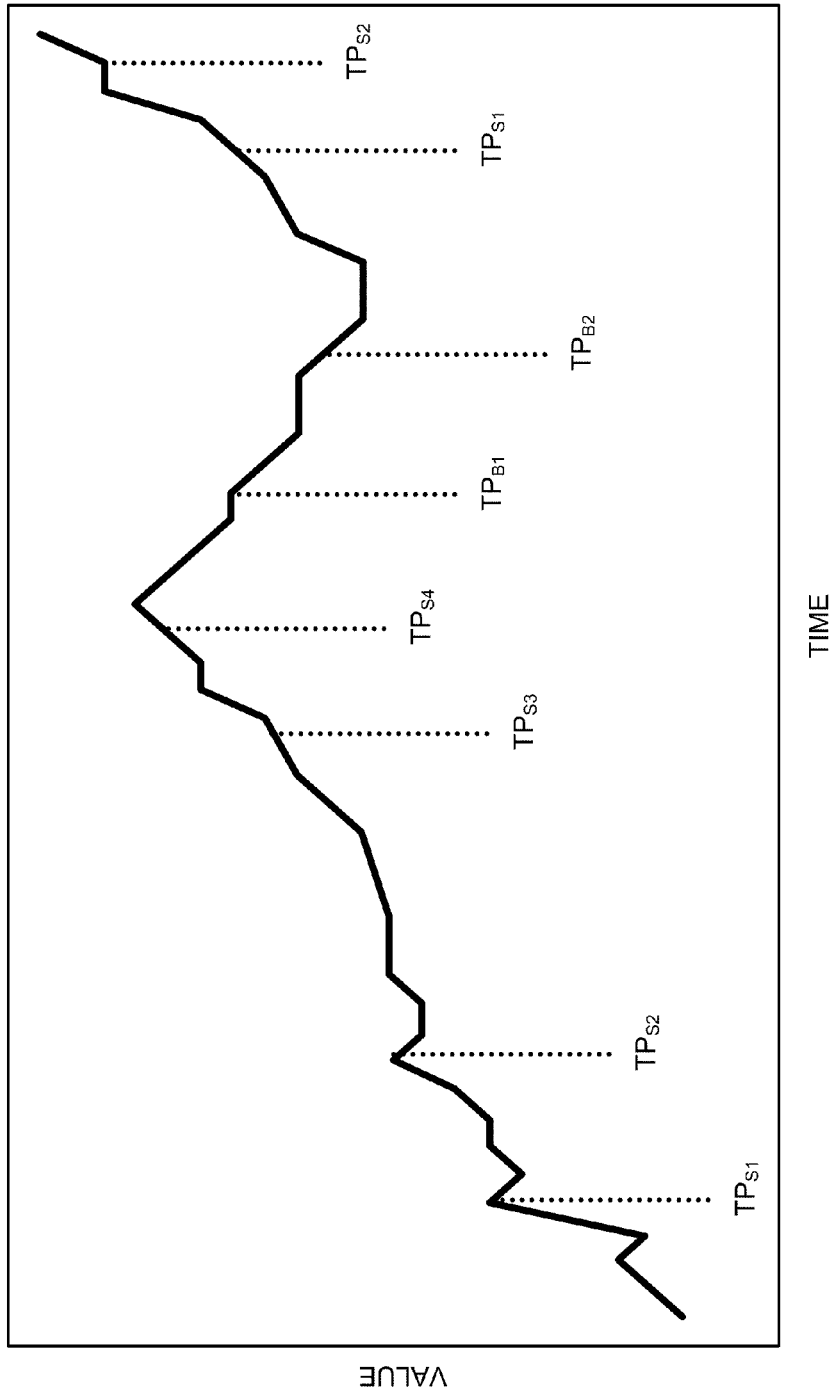
FIG. 4 is a chart illustrating a series of buy and sell orders for an asset class in which an intervening buy order resets the sell trigger point progression.

As illustrated in FIG. 4, in certain instances the TGI will indicate that a particular sequence of buy/sell trigger points is sufficient to reset the trigger point count. As reflected in the graph illustrated in FIG. 4, an asset class experiences a period of growth sufficient to reach four consecutive sell trigger points, counts S1-S4, followed by a period of decline sufficient to reach two consecutive buy trigger points, counts B1 and B2. Depending on the particular conditional rules provided in the TGI, the two consecutive buy trigger points may be, and in this example were, sufficient to reset the sell trigger point count. Accordingly, when the asset class enters the next growth period, the first sell trigger point reached is designated as count S1.

Figure 5:
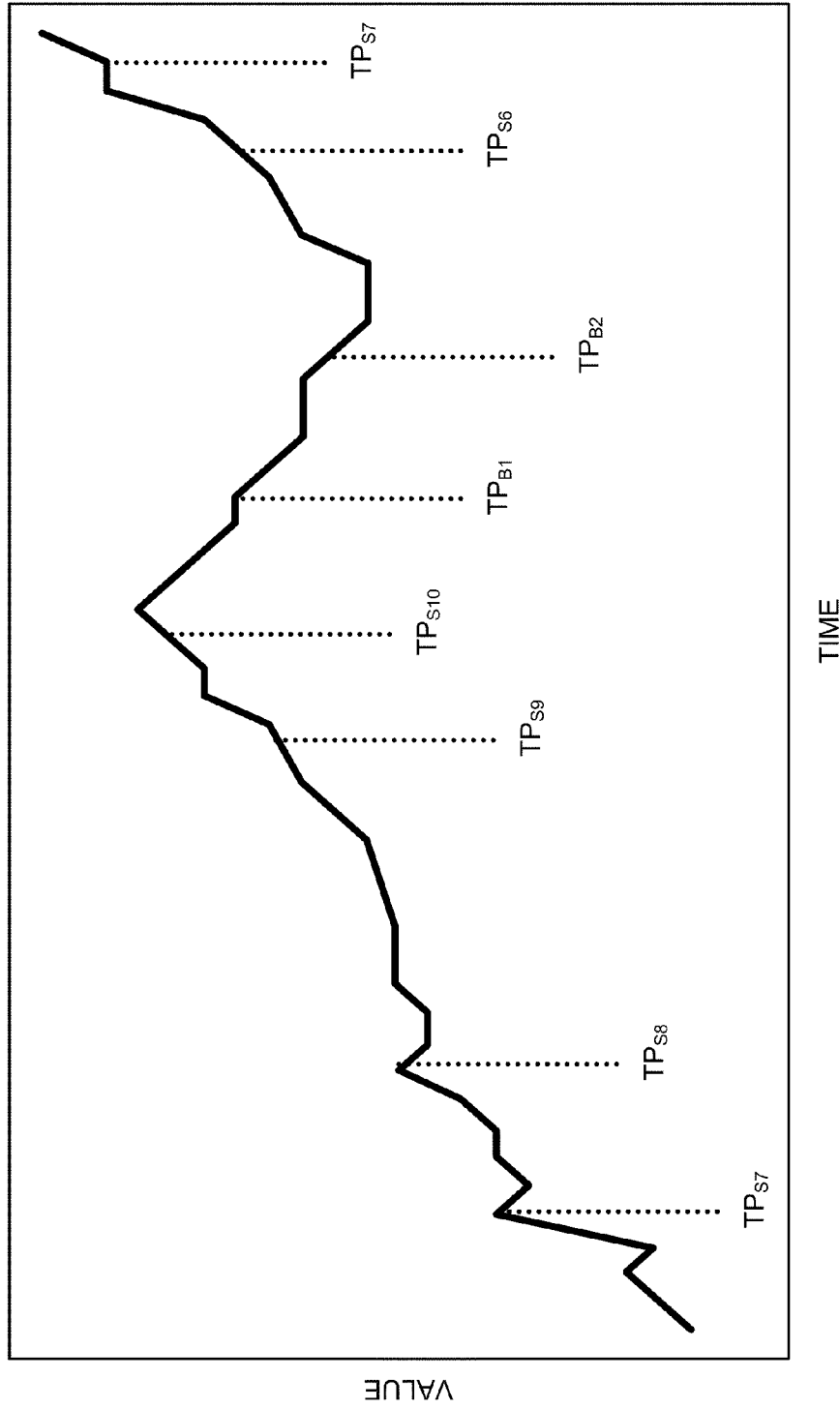
FIG. 5 is a chart illustrating a series of buy and sell orders for an asset class in which an intervening buy order only partially resets the sell trigger point progression.

As illustrated in FIG. 5, in certain instances the TGI will indicate that a particular sequence of buy/sell trigger points is sufficient to warrant a partial reset the trigger point count. As reflected in the graph illustrated in FIG. 5, an asset class experiences a period of growth sufficient to reach ten consecutive sell trigger points, counts S1-S10 (S1-S6 not shown), followed by a period of decline sufficient to reach two consecutive buy trigger points, counts B1 and B2. Depending on the particular conditional rules provided in the TGI, the two consecutive buy trigger points may be, and in this example were, sufficient to reset the sell trigger point count to an intermediate count. Accordingly, when the asset class enters the next growth period, the first sell trigger point reached is designated as count S6 rather than S1. As will be appreciated, the point at which the sell trigger point count is entered will typically be a function of the number and characteristics of the particular sell counts utilized by the system, the number and characteristics of the particular buy counts, the historical performance and/or information gleaned from back testing the various rules and parameters being utilized in executing the method.

Figure 6:
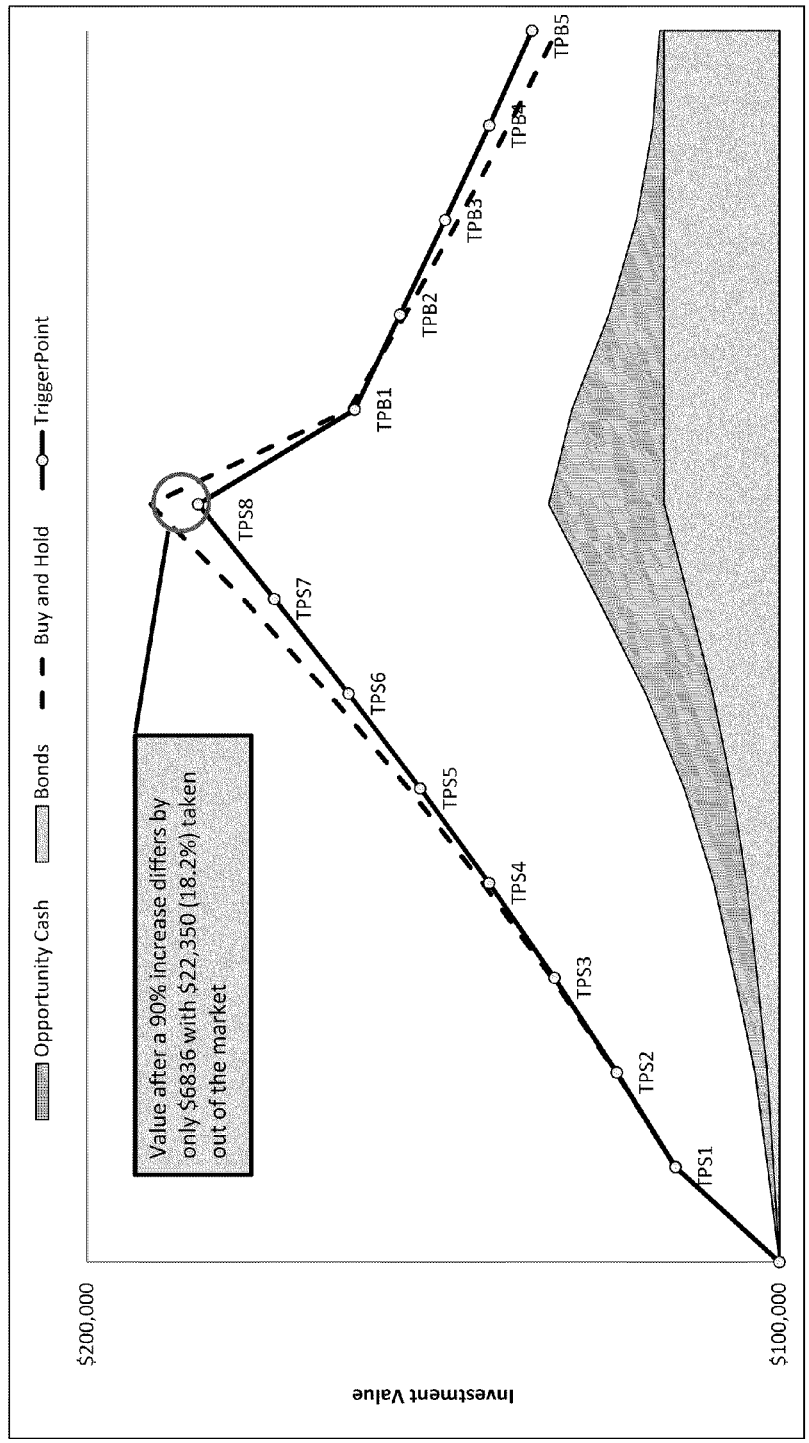
FIG. 6 is a chart illustrating a comparison of a portfolio managed using a conventional buy and hold (B&H) approach and a portfolio managed using the disclosed trigger point management method.

FIG. 6 illustrates the results of a hypothetical comparison between a portfolio managed using a conventional buy and hold strategy and a second portfolio managed using an embodiment of the trigger point strategy used in the disclosed method.

EXAMPLE

As discussed above, data from the previous day's closing values for the ETFs or other investment vehicles tracked in the portfolio are obtained from one or more sources and typically subjected to some form of verification procedure before being used to initiate portfolio adjustments. The data, preferably verified, is then used for calculating various parameters including $ROR_{CUR}$ and $ROR_{CUM}$ with the cumulative ROR being represented by the formula:

$$ROR_{CUM} = ((1+ROR_{CUM-1}) + ((1+ROR_{CUM-1}) * ROR_{CUR})) - 1$$

The $ROR_{CUM}$ is then compared against the values retrieved or derived from the assumptions table to determine if a buy or sell trigger has been reached. The assumptions table determines if a trigger has occurred by comparing the $ROR_{CUM}$ with the predetermined value as set in the assumptions table. It also determines how much to buy or sell (as set in the assumptions table) when a specific trigger is reached.

An exemplary set of conditional instructions found in an assumptions table may include, for example:

EXAMPLE SELL TRIGGER POINT COUNT SEQUENCE FOR A RISING MARKET 1 15% gain after a 25% or more decline-trim 10% of incremental gain (1.5% of position) and put 50% of proceeds in cash and 50% in bonds;
2 Next 7.5% gain from previous trigger without a 15% decline from the Maximum Daily Value (MDV)-trim 20% of incremental gain (1.5% of position) put 50% of proceeds in cash and 50% in bonds;
3 Next 7.5% gain from previous trigger without a 15% decline from the MDV-trim 20% of incremental gain (1.5% of position) put 50% of proceeds in cash and 50% in bonds;
4 Next 7.5% gain from previous trigger without a 15% decline from the MDV-trim 30% of incremental gain (2.25% of position) put 50% of proceeds in cash and 50% in bonds;
5 Next 7.5% gain from previous trigger without a 15% decline from the MDV-trim 30% of incremental gain (2.25% of position) put 50% of proceeds in cash and 50% in bonds;
6 Next 7.5% gain from previous trigger without a 15% decline from the MDV-trim 40% of incremental gain (3% of position) put 50% of proceeds in cash and 50% in bonds;
7 Next 7.5% gain from previous trigger without a 15% decline from the MDV-trim 50% of incremental gain (3.75% of position) put 50% of proceeds in cash and 50% in bonds;
8 Next 7.5% gain from previous trigger without a 15% decline from the MDV-trim 60% of incremental gain (4.5% of position) put 50% of proceeds in cash and 50% in bonds;
9 Next 7.5% gain from previous trigger without a 15% decline from the MDV-trim 60% of incremental gain (4.5% of position) put 50% of proceeds in cash and 50% in bonds;
10 Next 7.5% gain from previous trigger without a 15% decline from the MDV-trim 80% of incremental gain (6% of position) put 50% of proceeds in cash and 50% in bonds;
11 Next 7.5% gain from previous trigger without a 15% decline from the MDV-trim 80% of incremental gain (6% of position) put 50% of proceeds in cash and 50% in bonds;
12 Next 7.5% gain from previous trigger without a 15% decline from the MDV-trim 90% of incremental gain (6.75% of position) put 50% of proceeds in cash and 50% in bonds;
13 Next 7.5% gain from previous trigger without a 15% decline from the MDV-trim 100% of incremental gain (7.5% of position) put 50% of proceeds in cash and 50% in bonds; and
14 Continues on at 100% of incremental gain.

EXAMPLE BUY TRIGGER POINT COUNT SEQUENCE FOR A DECLINING MARKET 1 15% decline from the MDV—buy 20% of opportunity cash into the market;
2 Next 5% decline (−20%)—buy 40% of available cash into the asset class;
3 Next 5% decline (−25%)—buy 50% of available cash into the asset class;
4 Next 5% decline (−30%)—buy 60% of available cash into the asset class;
5 Next 5% decline (−35%)—buy 60% of available cash into the asset class;
6 Next 5% decline (−40%)—buy 60% of available cash into the asset class; and
7 Next 5% decline (−45%)—buy 100% of available cash into the asset class.

Each time a consecutive trigger in the same direction has been reached, the program increments the corresponding trigger count. For example, the first "Sell Trigger" reached by an asset class applying the assumptions/count sequences defined above would be designated as sell trigger point 1 and the system would initiate (or generate an order for) the sale of 10% of the incremental gain (1.5% of position) with the proceeds divided 50/50 between cash and bonds. If that asset class continued to rise and it hit the next trigger (up 7.5% from the previous trigger), this would be sell trigger point 2 and would initiate the actions indicated above. If, however, the asset class were then to decline 15% from the MDV, the buy trigger point 1 would be reached and the system would initiate (or generate an order for) the purchase into the asset class using 20% of the opportunity cash set aside from previous sell trigger point transactions to buy back into that market. The system would track and analyze subsequent buy/sell trigger points according to the current logical rules for determining the appropriate "count" level for the next buy/sell trigger point. As will be appreciated, the actual percentages utilized at each buy/sell trigger point may be adjusted as desired, for example, to implement more or less aggressive investment strategies, incorporate improved market modeling information and/or back testing data and thereby better achieve the desired goals of the portfolio(s) being managed in this manner.

As detailed above, the Maximum Daily Value (MDV) can be used for modifying the next buy trigger point. For example, let's assume 2 consecutive sell triggers have been reached and the asset class continues to appreciate by an additional 7% (but does not reach the next sell trigger at 7.5%) before beginning a decline. Without the MDV calculation, the next buy trigger point would not be reached until that asset class had experienced a 22% decline, but with the MDV adjustment the asset class need only decline 15% from the MDV in order to reach the next buy trigger point. This allows the system to recognize a true decline in investment value of 15%. As will be appreciated, this MDV adjustment is used only with respect to the first buy trigger point with each subsequent buy trigger point being executed in accord with the instructions obtained from the assumptions table.

Similarly, as detailed above, the system can incorporate a "Magnitude" reset protocol to suppress or avoid overreactions to "false starts" or relatively minor perturbations in the relevant market by determining a "reentry" count number to allow for more appropriate actions to be taken.

An example of the logic that may be applied for controlling entry into a multi-step sell trigger sequence is provided below:

When the trigger point reached="BUY"
    if there are 2 consecutive buy triggers (a decline of at least 25%) and IF the sell count immediately prior to these buy triggers was at a sell count of at least 13 (on a 14 count scale) (up at least 105%) then the next sell trigger will be count number 5;
    if there is 1 buy trigger (market is down at least 20% and less than 25%) and IF the sell count immediately prior to that buy trigger was at a sell count of at least 13 then the next sell trigger will be count number 7;
    if there are 2 buy triggers and IF the sell count immediately prior to these buy triggers was at a sell count of 2-12 (up at least 22.5% and less than 105%) then the next sell trigger will be count number 3;
    if there is 1 buy trigger and IF the sell count immediately prior to that buy trigger was at a sell count of 4-12 (up at least 30% and less than 105%) then the next sell trigger will be count number 5;
    if there is 1 buy trigger and IF the sell count immediate prior to that buy trigger was at a sell count of 1-3 (up less than 37.5%) then the next sell trigger will reset to count number 1.

If the trigger point reached="Sell"
    If immediately prior to the sell trigger the buy count was less than 3 (the market was previously down less than 25%) then the next buy trigger number will be reset to count 1;
    If immediately prior to the sell trigger the buy count was at least 3 then the next buy trigger number will be the previous buy count incremented by 1;
    If this trigger is the second consecutive sell trigger, then the next buy trigger will be reset to count 1.

The logic described above addresses the dilemma of a market that has done extremely well and then has a slight correction. The logic rules relating to the particular sequence and relative step of a series of buy/sell trigger points allows the method to respond differently to different "correction" scenarios including, for example, how much of a correction warrants resetting the buy/sell logic back to the respective first buy/sell trigger points rather than a partial reset to an intermediate buy/sell trigger point.

Other variations and combinations of the disclosed features, systems and methods will be apparent to those skilled in the art and are intended to be encompassed within the disclosure herein.

The invention claimed is:

1. A portfolio management method recorded on a non-transitory computer-readable medium and for execution by a computer, comprising:
    retrieving, by the computer, updated financial data corresponding to an asset class;
    accessing, by the computer, historical financial data corresponding to the asset class;
    calculating, by the computer, rate of return criteria from the updated and historical financial data for the asset class;
    setting, by the computer, a sell trigger point and a buy trigger point for the asset class;
        calculating, by the computer, a maximum daily value (MDV) from the updated and historical financial data for the asset class; and
        adjusting, by the computer, the sell trigger point in response to an increase in the MDV or the buy trigger point in response to a decrease in the MDV;
    determining, by the computer, if the rate of return criteria meets the sell trigger point for the asset class and, if so, then
        setting a sell count value specific to the asset class, by the computer, using historical sell trigger point data and historical buy trigger point data; and
    executing, by the computer, a predetermined sell procedure corresponding to the sell count value specific to the asset class; and
    determining, by the computer, if the rate of return criteria meets the buy trigger point for the asset class and, if so, then
        setting a buy count value specific to the asset class, by the computer, using historical sell trigger point data and historical buy trigger point data; and
    executing, by the computer, a predetermined buy procedure corresponding to the buy count value specific to the asset class.

2. The portfolio management method according to claim 1, further comprising:
repeating the method for a plurality of asset classes.

3. The portfolio management method according to claim 2, wherein:
the number of asset classes is at least six.

4. The portfolio management method according to claim 1, wherein:
a plurality of sell count values is utilized; and
a plurality of buy count values is utilized.

5. The portfolio management method according to claim 4, wherein:
at least 10 sell count values are utilized; and
at least 5 buy count values are utilized.

6. The portfolio management method according to claim 4, wherein:
the plurality of sell count values correspond to at least two different predetermined sell procedures.

7. The portfolio management method according to claim 4, wherein:
the plurality of buy count values correspond to at least two different predetermined buy procedures.

8. The portfolio management method according to claim 1, wherein setting the sell trigger point further comprises:
determining, by the computer, a sequence for a predetermined number of previous trigger points;
comparing, by the computer, the sequence to a plurality of conditional rules for determining the sell count value of the next sell trigger point.

9. The portfolio management method according to claim 8, wherein setting the buy trigger point further comprises:
determining, by the computer, a sequence for a predetermined number of previous trigger points;
comparing, by the computer, the sequence to a plurality of conditional rules for determining the buy count value of the next buy trigger point.

10. A portfolio management system for execution by a computer, comprising:
an input module, embodied in non-transitory computer-readable media suitable for controlling the function of the computer, configured for retrieving updated financial data corresponding to an asset class;
a memory module, embodied in non-transitory computer-readable media suitable for controlling the function of the computer, configured for storing and retrieving historical financial data corresponding to the asset class;
a processor module, embodied in non-transitory computer-readable media suitable for controlling the function of the computer, configured for
calculating, with the computer, rate of return criteria from the updated and historical financial data for the asset class;
setting, with the computer, a sell trigger point and a buy trigger point for the asset class;
calculating, by the computer, a maximum daily value (MDV) from the updated and historical financial data for the asset class; and
adjusting, by the computer, the sell trigger point in response to an increase in the MDV or the buy trigger point in response to a decrease in the MDV;
determining, with the computer, if the rate of return criteria meets the sell trigger point for the asset class and, if so, then
setting a sell count value specific to the asset class, by the computer, using historical sell trigger point data and historical buy trigger point data; and
executing, with the computer, a predetermined sell procedure corresponding to the sell count value specific to the asset class; and
determining, with the computer, if the rate of return performance meets the buy trigger point for the asset class and, if so, then
setting a buy count value specific to the asset class, by the computer, using historical sell trigger point data and historical buy trigger point data; and
executing, with the computer, a predetermined buy procedure corresponding to the buy count value specific to the asset class; and
an output module, embodied in non-transitory computer-readable media, configured for generating, with the computer, a human or machine readable report reflecting a status corresponding to the asset class.

11. The portfolio management system according to claim 10, wherein:
the input module is configured for retrieving updated financial data corresponding to a plurality of asset classes;
the memory module is configured for storing and retrieving historical financial data corresponding to each of the asset classes;
the processor module is configured for
calculating, with the computer, rate of return criteria from the updated and historical financial data for each of the asset classes;
setting, with the computer, a sell trigger point and a buy trigger point for each of the asset classes;
determining, with the computer, if the rate of return criteria meets the sell trigger point for any of the asset classes and, if so, executing, with the computer, a predetermined sell procedure corresponding to a sell count value specific to each of the asset classes for which the sell trigger point was met; and
determining, with the computer, if the rate of return performance meets the buy trigger point for any of the asset classes and, if so, executing, with the computer, a predetermined buy procedure corresponding to a buy count value specific to each of the asset classes for which the buy trigger point was met; and
the output module is configured for generating a human or machine readable report reflecting a status corresponding to each of the asset classes.

12. The portfolio management system according to claim 11, wherein:
the output module is configured for generating, with the computer, a plurality of human or machine readable reports reflecting a status corresponding to a plurality of combinations of the asset classes.

13. The portfolio management system according to claim 11, wherein:
the input module is configured whereby at least one system criteria selected from a group consisting of sell trigger points, buy trigger points, asset classes, report formats, sell count values, buy count values, predetermined sell procedures and predetermined buy procedures can be modified.

14. The portfolio management system according to claim 13, wherein:
the input module is configured whereby at least one system criteria can be modified by an account holder.

* * * * *